United States Patent
Liu et al.

(10) Patent No.: US 11,416,312 B1
(45) Date of Patent: Aug. 16, 2022

(54) NEAR-REAL-TIME DATA PROCESSING WITH PARTITION FILES

(71) Applicant: Microsoft Technology Licensing, LLC., Redmond, WA (US)

(72) Inventors: Xu Liu, Sammamish, WA (US); Steve Chun-Hao Hu, Bellevue, WA (US); Abhishank Sahu, Renton, WA (US); Yingji Ju, Bellevue, WA (US); Gunter Leeb, Redmond, WA (US); Jose Fernandez, Renton, WA (US); Swadhin Ajay Thakkar, Bellevue, WA (US); William Edward Miao, Seattle, WA (US); Sravanthi Pereddy, Sammamish, WA (US); Jordan Robert Fitzgibbon, Seattle, WA (US); Raveena Dayani, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/175,491

(22) Filed: Feb. 12, 2021

(51) Int. Cl.
  *G06F 9/46* (2006.01)
  *G06F 9/52* (2006.01)
  *G06F 9/50* (2006.01)

(52) U.S. Cl.
  CPC ............ *G06F 9/52* (2013.01); *G06F 9/5061* (2013.01)

(58) Field of Classification Search
  CPC ................................ G06F 9/52; G06F 9/5061
  See application file for complete search history.

(56) References Cited

U.S. PATENT DOCUMENTS

| | | | |
|---|---|---|---|
| 7,945,540 B2 | 5/2011 | Park et al. | |
| 8,978,034 B1 | 3/2015 | Goodson et al. | |
| 10,298,444 B2 | 5/2019 | Bishnoi et al. | |
| 10,338,958 B1 | 7/2019 | Kamboj et al. | |
| 2005/0256967 A1 | 11/2005 | Winter | |
| 2015/0134626 A1 | 5/2015 | Theimer et al. | |
| 2016/0232192 A1 | 8/2016 | Shimanovsky et al. | |
| 2017/0083368 A1 | 3/2017 | Bishop et al. | |
| 2017/0083380 A1 | 3/2017 | Bishop et al. | |

OTHER PUBLICATIONS

"Apache Hadoop", Retrieved From: https://web.archive.org/web/20201120190750/https7/en.wikipedia.org/wiki/Apache_Hadoop, Nov. 20, 2020, 14 Pages.

(Continued)

*Primary Examiner* — Gregory A Kessler
(74) *Attorney, Agent, or Firm* — Workman Nydegger

(57) ABSTRACT

Embodiments disclosed herein are related to implementing a near-real-time stream processing system using the same distributed file system as a batch processing system. A data container and partition files are generated according to a partition window that specifies a time range that controls when data is to be included in the partition files. The data container is scanned to determine if the partition files are within a partition lifetime window that specifies a time range that controls how long the partition files are active for processing. For each partition file within the lifetime window, processing tasks are created based on an amount of data included in the partition files. The data in the partition files is accessed and the processing tasks are performed. Information about the partition files is recorded in a configuration data store.

20 Claims, 12 Drawing Sheets

(56) References Cited

OTHER PUBLICATIONS

"Apache Kafka", Retrieved From: https://web.archive.org/web/20201117040514/https:/kafka.apache.org/, Nov. 17, 2020, 4 Pages.
"Batch Processing", Retrieved From: https://web.archive.org/web/20201205040829/https://en.wikipedia.org/wiki/Batch_processing, Dec. 5, 2020, 5 Pages.
"Event Hubs", Retrieved From: https://web.archive.org/web/20201127013428/https:/azure.microsoft.com/en-us/services/event-hubs/, Nov. 27, 2020, 16 Pages.
"Publish-Subscribe Pattern", Retrieved From: https://web.archive.org/web/20201203043519/https://en.wikipedia.org/wiki/Publish%E2%80%93subscribe_pattern, Dec. 3, 2020, 5 Pages.
"Stream Processing", Retrieved From: https://web.archive.org/web/20201029101918/https://en.wikipedia.org/wiki/Stream_processing, Nov. 25, 2020, 13 Pages.
Carbone, et al., "Apache Flink: Stream and Batch Processing in a Single Engine", In Bulletin of the IEEE Computer Society Technical Committee on Data Engineering, vol. 36, Issue 4, Jan. 2015, pp. 28-38.
Condie, et al., "MapReduce Online", In Technical Report Submitted to University of California at Berkeley, Oct. 9, 2009, 16 Pages.
Estabrook, et al., "The Azure Blob Filesystem Driver (ABFS): A Dedicated Azure Storage Driver for Hadoop", Retrieved From: https://docs.microsoft.com/en-us/azure/storage/blobs/data-lake-storage-abfs-driver, Dec. 6, 2018, 3 Pages.
O'Driscoll, et al., "HBLAST: Parallelised Sequence Similarity—A Hadoop MapReducable Basic Local Alignment Search tool", In Journal of Biomedical Informatics, vol. 54, Apr. 2015, pp. 58-64.
U.S. Appl. No. 17/175,491, filed Feb. 12, 2021.
Jin, et al., "Towards Low-Latency Batched Stream Processing by Pre-Scheduling", in Journal of IEEE Transactions on and Distributed Systems, vol. 30, Issue 3, Mar. 1, 2019, pp. 710-722.
"International Search Report and Written Opinion Issued in PCT Application No. PCT/US22/013803", dated Apr. 25, 2022, 11 Pages.

NEAR-REAL-TIME DATA PROCESSING WITH PARTITION FILES

BACKGROUND

Data systems are heterogeneous; in many cases, a company or team have both a stream processing system and a batch processing system. The stream processing system provides insights in low latency but with high engineering cost and high resource cost (CPU, memory, storage, etc.). The batch processing system provides more comprehensive insights with low engineering cost and low running cost, but with high latency (hours or day).

In industry, a typical stream processing system requires distributed messaging queues which provide a publish-subscribe model to make stream processing easy and flexible. The messaging queue has a dedicated service and storage that provides real-time data processing but introduces high resource costs.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A stream processing system, which is built on top of a messaging queue, is able to provide real-time (sub-second or few second) data processing of data in a distributed messaging queue. While this may be advantageous in circumstances where real-time data processing is needed, providing this real-time data processing comes at a high resource cost. For example, the stream processing system, which is built on top of a messaging queue, requires a large amount of dedicated storage and processing resources to ensure that the new data is quickly processed. This is especially true in high data volume circumstances. In addition, it is typically required to know the number of partition files ahead of time so that the proper resources can be allocated. Accordingly, the stream processing system, which is built on top of a messaging queue, requires a company or the team that is implementing the stream processing system to have dedicated servers and storage for the system.

A batch processing system typically requires less resource cost than a stream processing system. For example, since the data in partition files is only processed after a given time window ends, fewer processing resources are needed because the data is processed in a large batch or chunk of data instead of event by event. Thus, the number of IOs can be reduced, leading to higher processing efficiency. However, since the processing is done after the end of the time window, there is high latency for receiving the processed results. For example, if the time window is a day, then the data will not be processed until after the day is done. Further, if any data from one time period is delayed in being provided to the system until after the end of the time period, that data will typically not be processed until the end of the next time window adding additional latency. An example of this is in the banking industry where a deposit received on a given day after 3 PM is added into the deposits for the next day. Thus, a batch processing system provides large data volume processing, but at a cost of delayed processing results.

Since both of the stream processing system and the batch processing system provide different advantages, it is common for a company or team to implement both systems. Thus, these companies or teams are required to have separate, dedicated resources for both systems. In addition, it quite common for the data that is to be processed to come from the same data producers and thus have to be duplicated so that both the stream processing system and the batch processing system are able to process the data in their respective ways. The need for two separate processing systems with their own dedicated resources can be costly.

The embodiments described herein aim to solve at least some of the above-mentioned problems by providing for a near-real-time stream processing system that is implemented using the same distributed file system as the batch processing system. In this way, data received by the distributed file system need not be duplicated. In some instances, the implementation of the near-real-time stream processing system may result in 70% or more reduction in engineering and resource costs.

In one embodiment a data container and one or more partition files within the data container are generated according to a defined partition window. The defined partition window specifies a first time range that controls when data is to be included in the one or more partition files of the data container. The data container is scanned to determine if the one or more partition files are within a defined partition lifetime window. The defined partition lifetime window specifies a second time range that controls how long the one or more partition files are considered active such that processing is to be performed on the one or more partitions. For each partition file within the defined lifetime window, one or more processing tasks are created based on an amount of data included in the one or more partition files. The data in the one or more partition files is accessed and the one or more processing tasks are performed. Information about the one or more partition files is recorded in a configuration data store.

In an embodiment, the one or more processing tasks comprise a sequential process where there is only one active processing task at any given time for a given partition file of the one or more partition files, a parallel process where two or more processing tasks are completed at substantially the same time by different processing instances for a given partition file of the one or more partition files, or a parallel process within a same processing instance where two or more processing tasks are assigned to be performed by the same processing instance for a given partition file of the one or more partition files.

In an embodiment, the one or more partition files are discovered dynamically at runtime. In another embodiment, the defined partition lifetime window is larger than the defined partition window.

In an embodiment, a second data container and one or more second partition files within the second data container are generated according to a second defined partition window. The second defined partition window specifies a third time range that has a beginning after an ending of the first defined partition window but before an ending of the defined partition lifetime window. Prior to the ending of the defined partition lifetime window, the one or more partition files in the first data container and the one or more second partition files in the second data container are scanned. The one or more partition files and the one or more second partition files are both considered active during the defined partition lifetime window One or more processing tasks are created for the one or more partition files and the one or more second partition files. The assigned processing tasks are performed. the information about the one or more partition files and information about the one or more second partition files are recorded in the configuration data store.

In an embodiment, the one or more partition files are closed when it is determined that the partition lifetime window has reached an end and it is determined that processing has been performed on all the data in the one or more partition files. In another embodiment, the information about the one or more partition files recorded in the configuration data store comprises information about the progress of the one or more processing tasks. In a further embodiment, the one or more processing tasks are defined by a partition file identifier, a start offset address location of the data, and an end offset address location of the data.

In an embodiment, a task manager component is configured to scan a data container to discover if the data container includes one or more partition files and upon discovery, to determine if the one or more partition files are within a defined partition lifetime window, the partition lifetime specifying a time range that controls how long the one or more partition files are considered active such that processing can be performed on the received data in the one or more partitions. The task manager component is further configured to create, for those partition files that are within the defined partition lifetime, one or more processing tasks. One or more task worker components are configured to receive the one or more processing tasks from the task manager component and perform processing on the data in the one or more partition files according to the one or more processing tasks. The task manager component is further configured to cause information about the one or more partition files and about progress of the one or more processing tasks to be stored in a configuration data store.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments disclosed herein are related to computing systems and methods for implementing a near-real-time stream processing system using the same distributed file system as a batch processing system. In one embodiment, a data container and one or more partition files within the data container are generated according to a defined partition window. The defined partition window specifies a first time range that controls when data is to be included in the one or more partition files of the data container. The data container is scanned to determine if the one or more partition files are within a defined partition lifetime window. The defined partition lifetime window specifies a second time range that controls how long the one or more partition files are considered active such that processing is to be performed on the one or more partitions. For each partition file within the defined lifetime window, one or more processing tasks are created based on an amount of data included in the one or more partition files. The data in the one or more partition files is accessed and the one or more processing tasks are performed. Information about the one or more partition files is recorded in a configuration data store.

Because the principles described herein may be performed in the context of a computing system, some introductory discussion of a computing system will be described with respect to FIG. 1. Then, this description will return to the principles of the near-real-time stream processing system with respect to the remaining figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
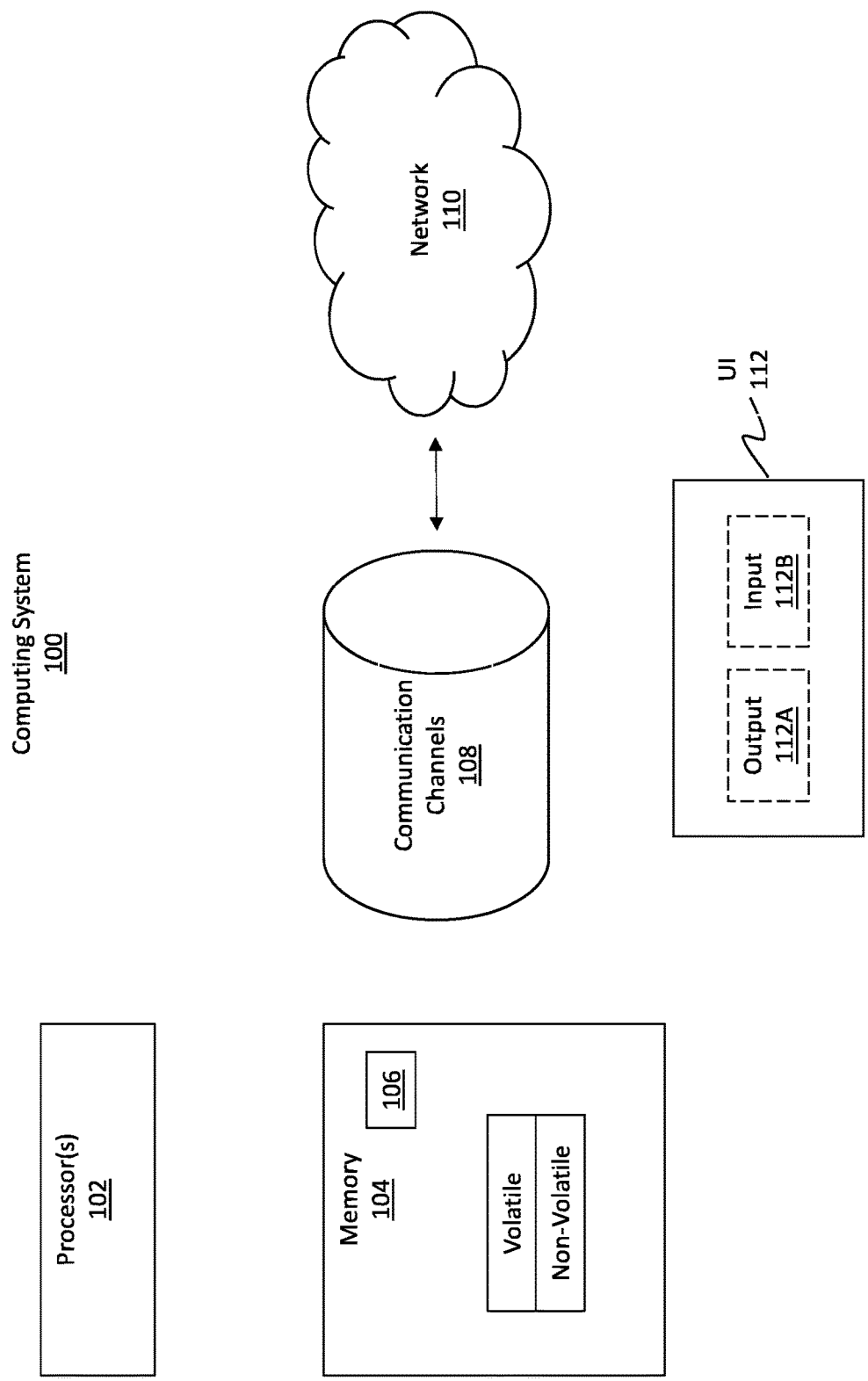
FIG. 1 illustrates an example computing system in which the principles described herein may be employed.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Figure 2A:
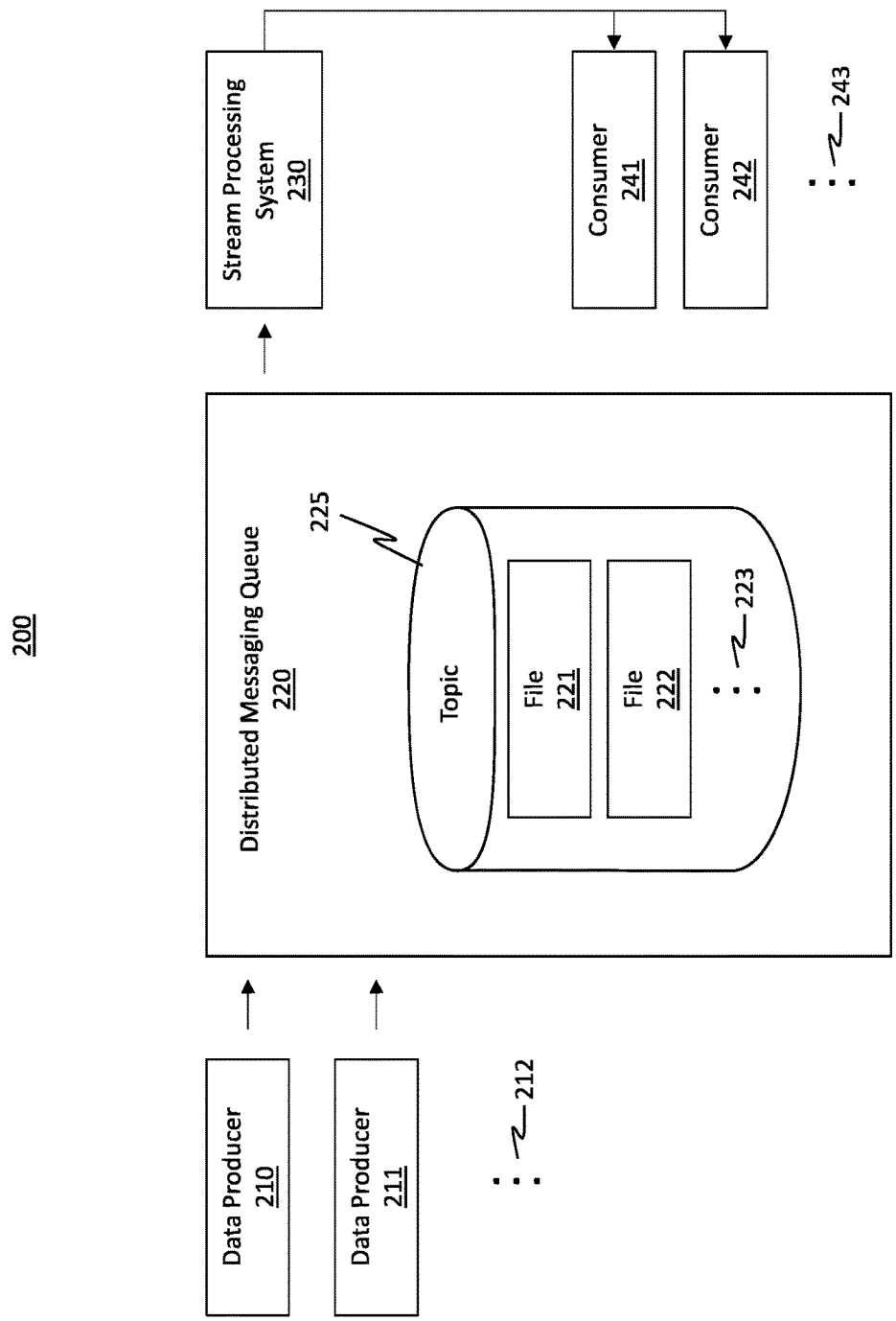
FIG. 2A illustrates a high-level view of a stream processing system.

FIG. 2A illustrates a high-level view of a stream processing system 200. As illustrated, the stream processing system 200 includes a data producer 210, a data producer 211, and any number of additional data producers as illustrated by the ellipses 212. In operation, the various data producers, which may be service endpoints or client endpoints, generate data or events that are to be processed by the stream processing system. In some embodiments, the data producers are referred to as "producers".

The generated data is then provided to a distributed messaging queue 220, where it is placed into various event files such as event file 221, event file 222, and any number of additional event files as illustrated by the ellipses 223 based on metadata such as an event key or other event file identifier. In some embodiments, the various event files are organized into a topic, such as topic 225. The messaging queue may be implemented in a distributed file system so that there are multiple replicas of each of the event files.

The event files are processed by the stream processing system 230, which may include multiple servers and processing instances. The stream processing system 230 uses a publisher/subscriber and related APIs associated with the messaging queue 220 to determine if any new data has been appended to the event files. If there has been new data appended to an event file, then the stream processing system will perform processing on this data. In this way, the data appended to the event files is generally processed in near-real-time. The processed data is then provided to a consumer 241, a consumer 242, or to any number of additional consumers as illustrated by the ellipses 243, which in some embodiments subscribe to receive data related to different topics.

Figure 2B:
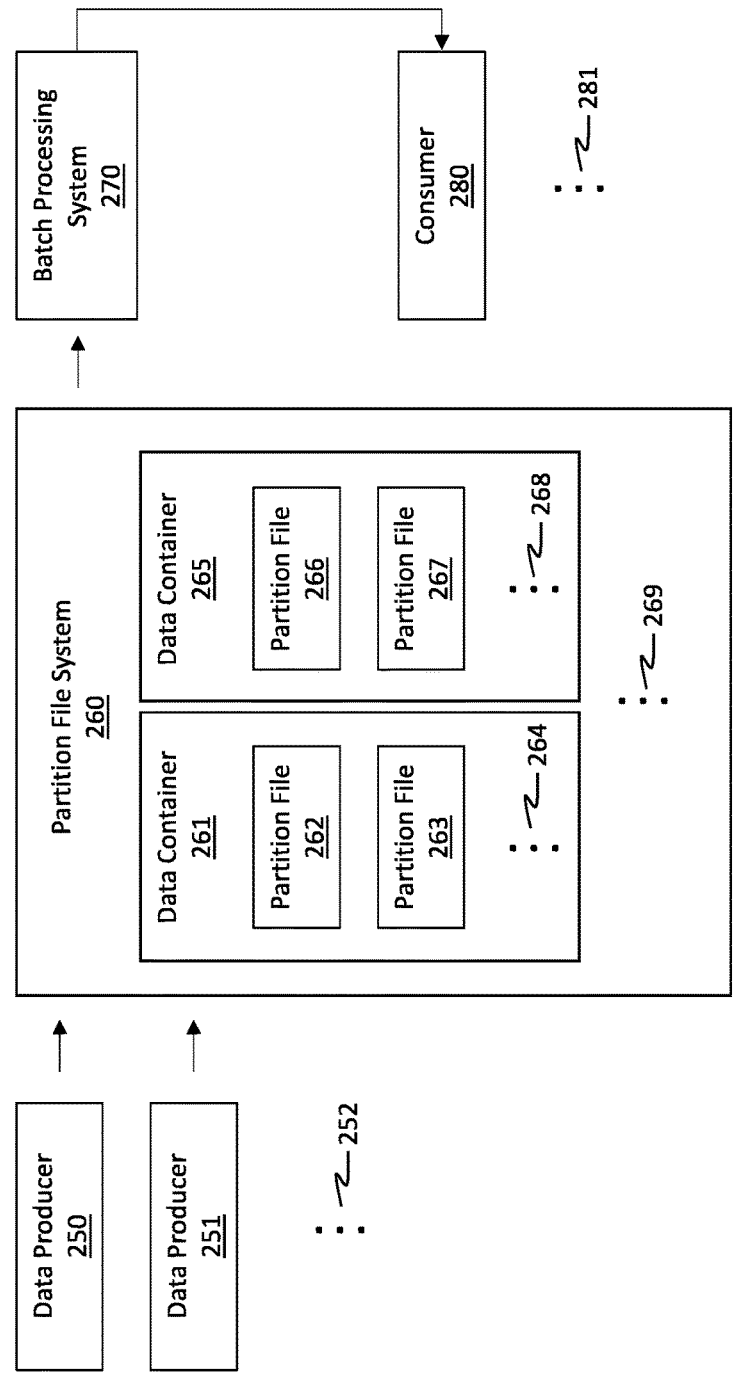
FIG. 2B illustrates a high-level view of a batch processing system.

FIG. 2B illustrates a high-level view of a batch processing system 205. As illustrated, the stream processing system 200 includes a data producer 250, a data producer 251, and any number of additional data producers as illustrated by the ellipses 252. In operation, the various data producers, which may be service endpoints or client endpoints, generate data or events that are to be processed by the batch processing system. In some embodiments, the data producers 250-253 may be the same as the data producers 210-212 or may generate the same data or events as the data producers 210-213. Thus, in such embodiments the data that is generated by the data producers is duplicated so that the data is provided to both the stream processing system 200 and the batch processing system 205.

The generated data is then provided to a partition file system 260. The partition file system 260 generates a logical data container such as data container 261 based on a given time window. For example, the data container 261 may be based on a time window that is one day or one hour. Within the data container 261, the data received during the time window is placed into partition files such as partition file 262, partition file 263, and any number of additional partition files as illustrated at by ellipses 264.

At the end of the given time window, the data in the partition files 262-264 is processed by the batch processing system 270, which may include multiple servers and processing instances. The results may then be provided to a consumer 280 and any number of additional consumers as illustrated by the ellipses 281.

Supposing that the time period for the data container 261 is one day, for example Feb. 1, 2020, then when it becomes Feb. 2, 2020, the partition file system 260 will generate a data container 265 for the time window of Feb. 2, 2020. Within the data container 265, the data received during the time window of Feb. 2, 2020 is placed into partition files such as partition file 266, partition file 267, and any number of additional partition files as illustrated at by ellipses 268.

At the end of the Feb. 2, 2020 time period, the data in the partition files 265-268 is processed by the batch processing system 270. The results may then be provided to the consumers 280 and 281. The ellipses 269 illustrate that any number of additional data containers for additional time windows may be generated by the partition file system 260 as needed.

As mentioned previously, the stream processing system 200 is able to provide real-time (sub-second or few second) data processing of the data in the distributed messaging queue 220. While this may be advantageous in circumstances where real-time data processing is needed, providing this real-time data processing comes at a high resource cost. For example, the stream processing system requires a large amount of dedicated storage and processing resources to ensure that the new data appended to a partition file is quickly processed. This is especially true in high data volume circumstances. In addition, it is typically required to know the number of partition files so that the proper resources can be allocated. Accordingly, the stream processing system 200 requires a company or the like that is implementing the stream processing system to have dedicated servers and storage for the system.

The batch processing system 205 typically requires less resource cost. For example, since the data in the partition files is only processed after the time window ends, fewer processing resources are needed. In addition, less storage resources are typically required. However, since the processing is done after the end of the time window, there is high latency for receiving the processed results. For example, if the time window is a day, then the data will not be processed until after the day is done. Further, if any data from one time period is delayed in being provided to the partition file system until after the end of the time period, that data will typically not be processed until the end of the next time window adding additional latency. An example of this is in the banking industry where a deposit received on a given day after 3 PM is added into the deposits for the next day. Thus, a batch processing system provides large data volume processing, but at a cost of delayed processing results.

Since both of the stream processing system 200 and the batch processing system 205 provide different advantages, it is common for a company to implement both systems. Thus, these companies are required to have separate, dedicated resources for both systems. In addition, it quite common for the data that is to be processed to come from the same data producers and thus have to be duplicated so that both the stream processing system and the batch processing system are able to process the data in their respective ways. The need for two separate processing systems with their own dedicated resources can be costly.

Figure 3:
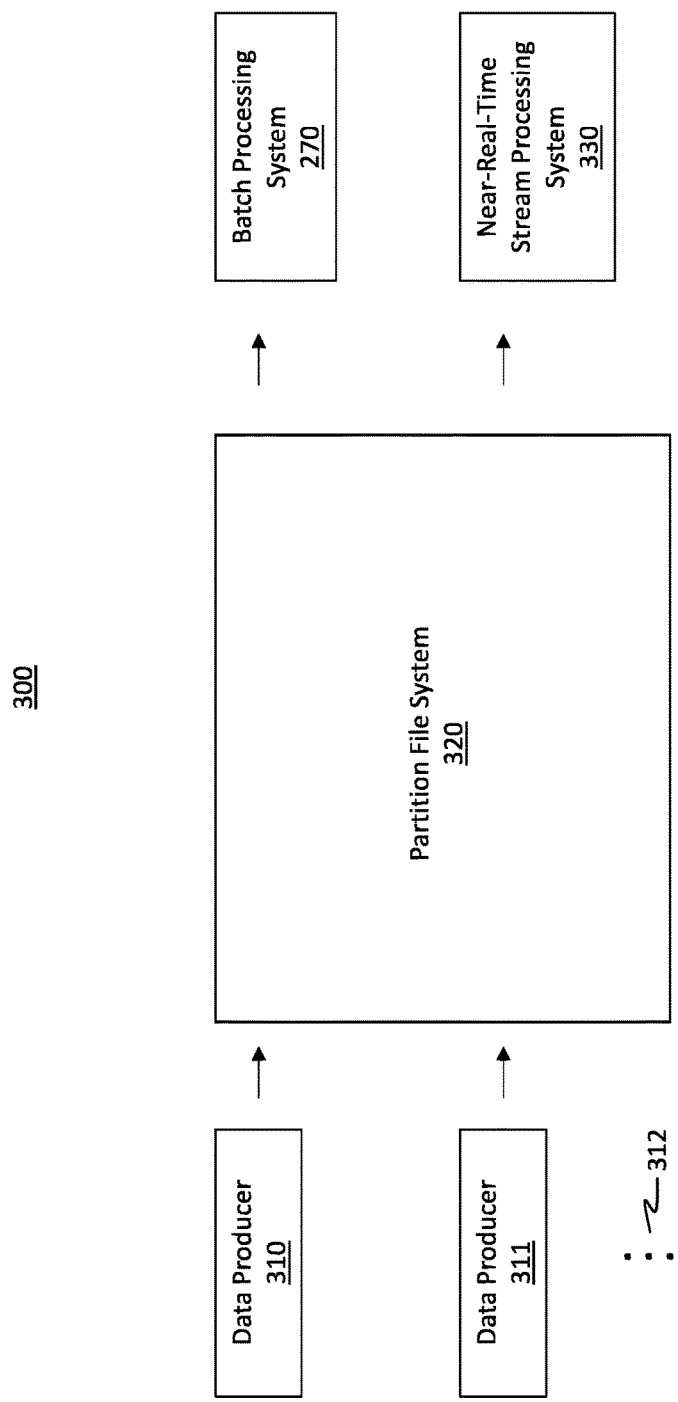
FIG. 3 illustrates a high-level view of a batch processing system and a near-real-time stream processing system.

Advantageously, the embodiments disclosed herein provide for the creation of a near-real-time stream processing system that uses the same input files as a batch processing system. By sharing the same input files, the need for additional storage and resources required by the messaging-queue based stream processing system described previously is eliminated. Accordingly, resource costs are reduced significantly since two dedicated systems are no longer needed. This is illustrated in FIG. 3, which illustrates an embodiment 300 of a processing system. As illustrated in the figure, data producers 310, 311 and potentially any number of producers 312, which may correspond to the previously described data producers provide data to a partition file system 320. The partition file system 320, which may correspond to the partition file system 260, receives the data and generates the data containers and partition files (not illustrated). The data in the partition files may then be processed by the batch processing system 270 and a near-real-time stream processing system 330. The partition file system 320 and the near-real-time stream processing system 330 will be described in more detail to follow.

The operation of the batch processing system 270 will now be described. For example, in the batch processing system 270, the data container 261 and its partition files 262 and 263 are accessed at the end of a defined partition window. The defined partition window will be described in more detail to follow. One or more batches of the data included in the partition files 262 and 263 are generated. Processing of the one or more batches of data may then be performed.

In this way, the processing system is configured to implement both the near-real-time stream processing system 330, as will be described in more detail to follow, and the batch processing system 270. Thus, in the processing system 300 the same data containers and the one or more partition files that are included in the data containers (i.e., data container 261 and partition files 261-263 and data container 265 and partition files 266-267) are accessible by the near-real-time stream processing system 330 and by the batch processing system 270. In some embodiments, the same data containers and the one or more partition files that are included in the data containers are accessible by both the near-real-time stream processing system 330 and by the batch processing system 270 at a same time or, alternatively, at a different time period. That is, the batch processing system 270 and the near-real-time stream processing system 330 may simultaneously process the data in the partition files of the various data containers. Alternatively, the batch processing system 270 and the near-real-time stream processing system 330 may process the data in the partition files of the various data containers at different times.

Figure 4A:
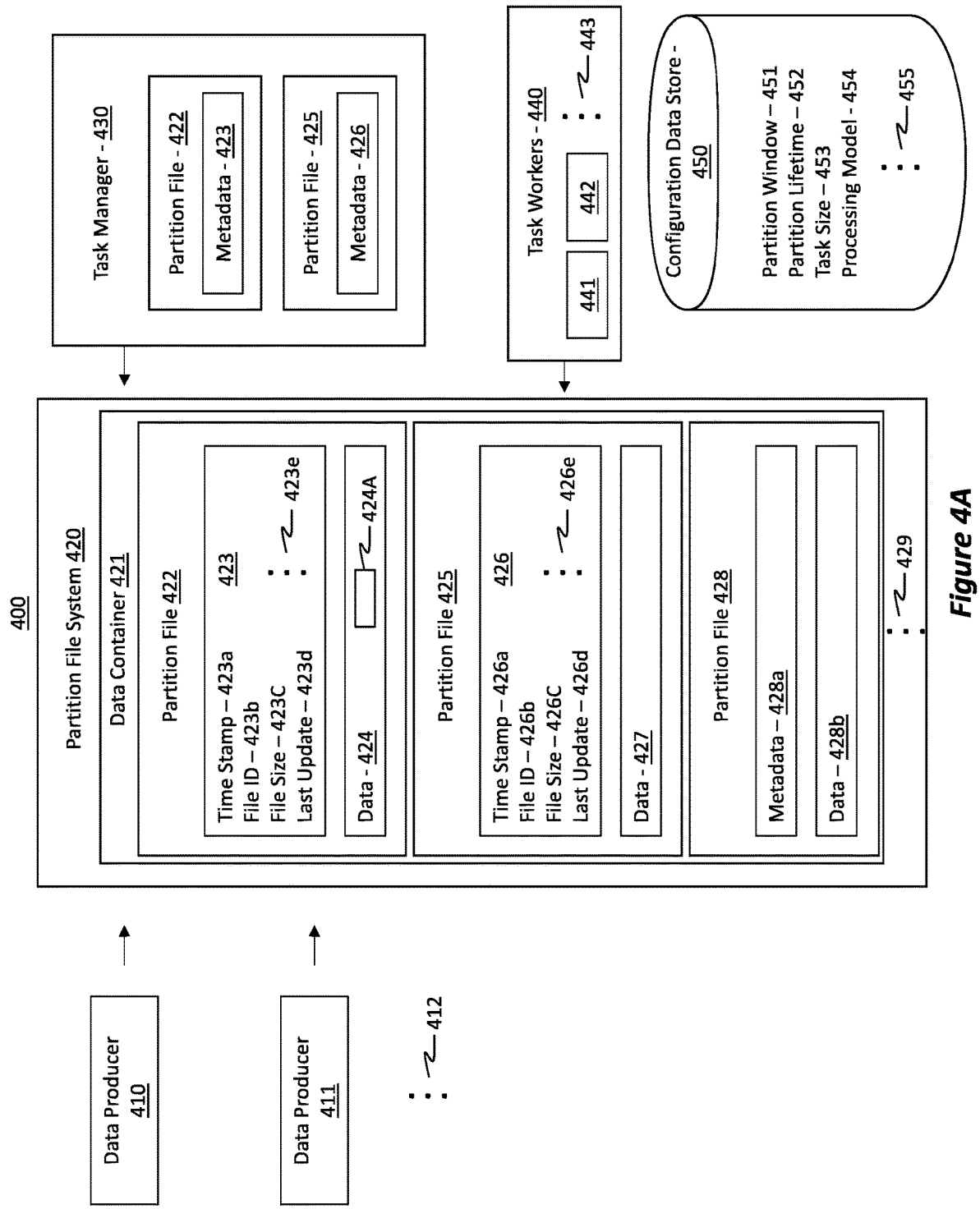
FIG. 4A illustrates an embodiment of a near-real-time stream processing system.

FIG. 4A illustrates an embodiment of a near-real-time stream processing system 400 such as the near-real-time stream processing system 330. As illustrated, the near-real-time stream processing system 400 includes a configuration data store 450. The configuration data store 450 may be any reasonable storage as circumstances warrant. In operation, the configuration data store 450 stores various configurations that are specify how the near-real-time stream processing system 400 is to operate. These configurations are typically configurable by a user of the system according to their operational needs. In addition, as will be described in more detail to follow, the task manager 430 uses the configuration data store to record the progress status of various processing tasks performed by the system.

As illustrated, the configuration data store 450 stores a partition window configuration 451. The partition window configuration is a time range or period that controls when data is to be included in a data container and its respective partition files. For example, the time range may be a day, an hour, or any other reasonable time range. As will be described in more detail to follow, data received by the system during the partition window is appended to one or more partition files in the data container corresponding to the partition window. In some embodiments, the partition window is defined by a window start time t1 and window size. For example, the window start time may be defined as the current date at 00:00:00 and the window size may be defined as 24 hours. Accordingly, if the current date were Jan. 16, 2020, data received on that date for 24 hours will be included in partition files included in a data container for that day. When the clock changes to 00:00:00 on Jan. 17, 2020, then data received on that date for 24 hours will be included in partition files included in a different data container for Jan. 17, 2020. This process would repeat for each new partition window of 24 hours.

The configuration data store 450 also stores a partition lifetime window configuration 452. The partition lifetime window configuration 452 is a time range or period that controls how long partition files are considered active so that processing can be performed on the partition files and thus functions as a measure of processing time. The time range may be the time range of the partition window plus an additional amount of time. Thus, if the partition window is one day, then perhaps the partition lifetime window may be 30 hours, which is six hours longer than the partition window. For example, the partition lifetime window may be defined by the partition window start time (i.e., Jan. 16, 2020 in the above example) at 00:00:00, the partition window size of 24 hours, and the additional amount of time of six hours (i.e., Jan. 17, 2020 at 06:00:00 end time) to reach the 30-hour size. When the clock changes to Jan. 17, 2020 at 00:00:00, then the partition lifetime window for the data container and its partition files generated on that date would be until Jan. 18, 2020 at 06:00:00. This would repeat for each new partition window. Of course, other amounts of time different from six hours may be used as the additional amount of time as circumstances warrant. Accordingly, since the partition lifetime window has a time range that equals the time range of the partition window plus the additional amount of time, the partition lifetime window is larger than the partition window.

In addition, the configuration data store 450 stores a task size configuration 453. In many embodiments the size of a partition file may be a few Gigabytes to several hundred Gigabytes. Accordingly, the task size configuration 453 is used to define a subset of the data that is to be processed during a given processing iteration. For example, in one embodiment the task size may be between 20 MB and 200 MB of data, although other task sizes may be chosen. As will be appreciated, the size of the task size configuration 453 helps determine the overall latency of the system. For example, the larger the size of the data subset, then the longer the latency will be as the system will wait for the subset of data corresponding to the task size configuration to be appended to the partition files before processing it. Thus, the size of the data subset may be set for a 10 second latency, a 30 second latency, a minute latency, or some other desired latency. Accordingly, it may be advantageous to avoid configuring the task size to be too large to avoid an undesirable long latency. On the other hand, if the subset of data in the task size configuration 453 is set too small, then efficiency may be lowered as the system may process a small amount of data. It will be appreciated that since there is some latency, usually at least a 10 second latency, for the subset of the data to be processed during a given processing iteration (i.e., processing task), the embodiments disclosed herein may be considered near-real-time stream processing system. In some embodiments, the task size configuration 453 may also define a timeout. The timeout specifies how long a task should be considered active. If the task size is not met within the defined timeout, a new, smaller task will be generated.

The configuration data store 450 further stores a processing model configuration 454. As will be explained in more detail to follow, the processing model configuration 454 allows for the selection of the type of processing to be performed on the data in the partition files. The ellipses 455 illustrate that there may be any number of addition configurations stored in the configuration data store 450 as circumstances warrant.

As illustrated n FIG. 4A, the near-real-time stream processing system 400 receives data such as telemetry data from a data producer 410, a data producer 411, and any number of additional data producers as illustrated by the ellipses 412. In operation, the various data producers, which may be service endpoints or client endpoints, generate data or events that are to be processed by the near-real-time stream processing system 400.

The received data is then provided to a partition file system 420, which may correspond to the partition file system 320. Although not illustrated, the partition file system 420 may include an ingestion pipeline that delivers the data from the producers 410-412 and that generates the various partition files. As illustrated, the partition file system 420 generates a logical data container 421 based on the time range defined in the partition window configuration 451. As discussed previously, the partition window may be a day, an hour, or some other reasonable time range.

The partition file system 420 generates partition files in the data container 421. For example, at a beginning of the partition window, a partition file 422 and a partition file 425 may be generated. The partition file 422 includes metadata 423 about the partition file and the data 424 that is appended to the partition file. The metadata 423 includes a time stamp 423a that indicates a time and/or date that can be used in conjunction with the partition window 451 to determine what data container the partition file should be placed. For example, if the data container is for the entire day of Jan. 2, 2020, then the time stamp 423a would indicate the date as Jan. 2, 2020. A file identification (ID) 423b identifies the file and may be a file Uniform Resource Locator (URL) that identifies the location of the partition file in the distributed file system. File size metadata 423c specifies the size of the partition file and is updated every time new data is appended to the partition file, for example when data 424a is appended to the data 424 at a later time. Last update metadata 423d specifies the time that the partition file was last updated and is updated every time new data is appended to the partition file such as when data 424a is appended to the data 424. The ellipses 423e illustrate that the partition file 422 may have additional metadata.

The partition file 425 includes metadata 426 about the partition file and the data 427 that is appended to the partition file. The metadata 426 includes a time stamp 426a that indicates a time and/or date that can be used in conjunction with the partition window 451 to determine what data container the partition file should be placed. For example, if the data container is for the entire day of Jan. 2, 2020, then the time stamp 426a would indicate the date as Jan. 2, 2020. A file identification (ID) 426b identifies the file and may be a file Uniform Resource Locator (URL) that identifies the location of the partition file in the distributed file system. File size metadata 426c specifies the size of the partition file and is updated every time new data is appended to the partition file. Last update metadata 426d specifies the time that the partition file was last updated and is updated every time new data is appended to the partition file. The ellipses 426e illustrate that the partition file 425 may have additional metadata.

The near-real-time stream processing system 400 includes a task manager 430. In operation, the task manager 430 is responsible for partition file discovery, partition file management, and task management. As shown in FIG. 4A, the task manager 430 scans or reads the metadata of each of the partition files. For example, the task manager 430 scans or reads the metadata 423 of the partition file 422 and the metadata 426 of the partition file 425. The task manager 430 uses the metadata 423 and 426, in particular the time stamps 423a and 426a and the last update metadata 423d and 426d, to determine if the partition files are within the partition lifetime window 452. In other words, the task manager 430 determines that the partition lifetime window 452 has not yet expired. If the partition lifetime window has not yet expired, then the partition files 422 and 426 are considered active partition files and the task manager 430 assigns processing tasks for the partition files as will be explained in more detail to follow.

The near-real-time stream processing system 400 includes task worker instances 440. The task worker instances 440 represent multiple processing instances that can be distributed across a number of virtual machines and other processors. For example, the task worker instances 440 may include a task worker instance 441, a task worker instance 442, and any number of additional task worker instances as illustrated by ellipses 443. As will be explained in more detail to follow, each of the task worker instances 440 are assigned, for a given time, zero, one, or multiple tasks by the task manager 430. The task worker instances are then able to access the data 424 and 427 in the partition files 422 and 425 and process the data.

Figure 4B:
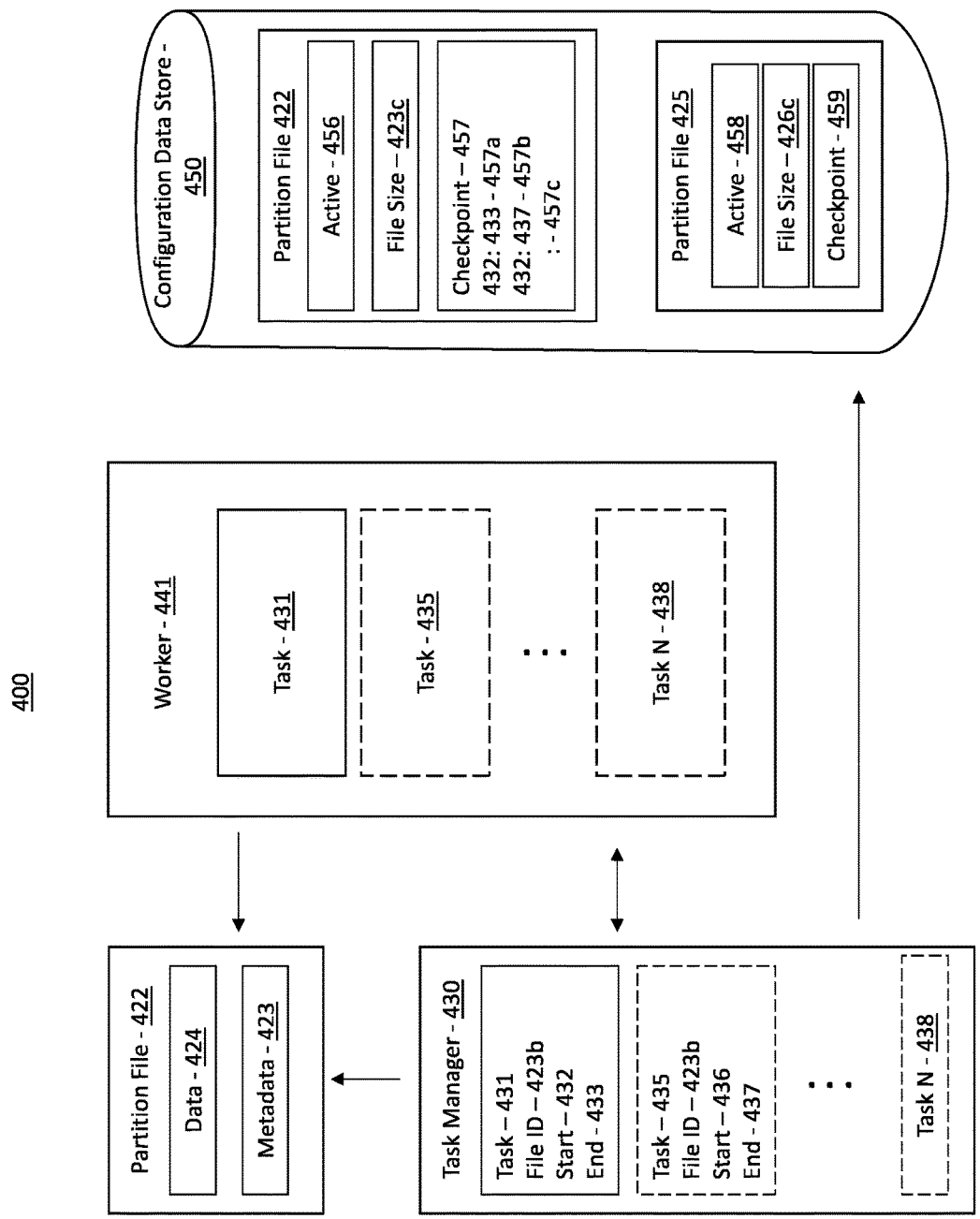
FIG. 4B illustrates an embodiment of sequential processing of a partition file.

FIG. 4B illustrates an embodiment of sequential processing of the partition file 422. As illustrated, in the embodiment the task manager 430 reads the metadata 423 to determine if the partition file 422 is active (i.e., within the partition lifetime window 452). In the embodiment, the partition file 422 is active and so the task manager 430 records in the configuration data store 450 that the partition file 422 is active as shown at 456 and also records the file size metadata 423c. The task manager 430 accesses the processing model configuration 454 to determine that sequential processing is to be performed. In other embodiments, however, the task manager 430 is able to dynamically choose the processing model to use without the need for the processing model configuration 454 based on the size of the various partition files.

The task manager uses the file size metadata 423c and a checkpoint record (i.e., checkpoint record 457) to create a processing task 431. The processing task 431 includes the file ID 423b. The processing task 431 also includes a continuous range of data in the partition file 422 that is defined by a start position 432 and an end position 433. As discussed previously, the size of the continuous range (and all continuous ranges discussed herein) is defined by the task size configuration 453.

The task manager 430 assigns the task 431 to the task worker instance 441 of the task worker instances 440. The task worker instance 441 directly accesses the continuous data range defined by the start position 432 and the end position 433 and performs the appropriate processing on this data. It will be noted that the task manger 430 does not access the actual data in the partition file 422 (or any of the partition files), but only reads the metadata as discussed. This allows for the task manager 430 to be implemented with low resource cost. In addition, since only the task worker instances access the actual data, different types of data specific logic can be used by the task worker instances while still maintaining the implementation and design of the task manager 430.

Once the task worker instance 441 has completed the processing task 431, it reports this to the task manager 430. The task manager 430 will then track the progress of the processing for partition file 422 in the configuration data store 450. The progress record may be a checkpoint record 457 that indicates the address range of the data that has been processed. In the current embodiment, the checkpoint record 457 would indicate that the address range of the data between the start position 432 and the end position 433 has been processed as denoted by 457a.

Since sequential processing of the partition file 422 is being performed, there is only one active task at any given time. Accordingly, once the processing task 431 is completed, the task manager 430 creates a second processing task 435. The second processing task 435 includes the file ID 423b for the partition file 422. The second processing task 435 also includes a continuous range of data in the partition file 422 that is defined by a start position 436 and an end position 437. In addition, the task manager 430 uses the checkpoint record 457a to ensure that the data defined by the start position 436 and an end position 437 has not already been processed.

Although FIG. 4B shows that the second processing task 435 being assigned to the task worker instance 441 of the task worker instances 440, this is for ease of illustration only. The dashed lines around the second processing task 435 illustrate that the second processing task 435 may be assigned to a different task worker instance 440 than the worker instance 441. The task worker instance 441 (or the other task worker instance) directly accesses the continuous data range defined by the start position 436 and the end position 437 and performs the appropriate processing on this data.

Once the task worker instance 441 (or the other task worker instance) has completed the processing task 431, it reports this to the task manager 430. The task manager 430 than updates the checkpoint record 457. In the current embodiment, the checkpoint record would be updated to indicate that the address range of the data between the start position 432 and the end position 437 has been processed as denoted by 457b. This is because in sequential processing, the end position of a previous processing task (i.e., end position 433 of processing task 431) is typically the same as the starting position of a subsequent processing task (i.e., start position 436 of second processing task 435). Thus, the task manager 430 merges the checkpoint 457a with the updated progress record into the checkpoint 457b.

Once the second processing task 435 is completed, the task manager 430 may continue to scan the partition file 422 for file size and update changes and continue to create additional processing tasks as needed. This is illustrated by the ellipses and processing task N 438. The processing tasks up to processing task N 438 are then provided to a task worker instance for processing in the manner previously discussed and the checkpoint record 457 is updated accordingly as denoted by the ellipses 457c. It will be appreciated that illustration of the checkpoint records 457a, 457b, and 457c is for ease in showing that the task manager 435 continually updates the checkpoint record 457. However, it will be appreciated that there is typically only one checkpoint record that is kept in the configuration store 450 at a time. Thus, when the checkpoint record 457a is updated to checkpoint record 457b, the checkpoint record 457a is removed from the configuration store and when the checkpoint record 457b is updated to the checkpoint record 457c, then the checkpoint record 457b is removed and so on every time the checkpoint record 457 is updated.

As discussed previously, the address range for processing the data in the partition file 422 is defined by the start position and the end position of each processing task. Thus, it may be possible that the start position or the end position for any given processing task is in the middle of one data record. Accordingly, in some embodiments the data records may be formatted to be splittable. In such embodiments, the task worker instances 440 are able to read forwards and backwards in the data to find the indicated start position or end position. For example, if the end position is in the middle of one record, the task worker instances 440 will either discard the last partial record or read a little more to get a complete record. In either case, the checkpoint will be adjusted to the end of the record in the configuration data store 450. Given the checkpoint can be adjusted to the end position of one record, there is typically not the problem that start position is in the middle of one record. However, in case there is corruption, the task worker instances 440 will move backward to find the current record's start position.

In other embodiments, it is possible that the task size specified by the task size configuration 453 is larger than the remaining data in the partition file 422. Accordingly, in such embodiments the task manager 430 may create a processing task that only includes the remaining unprocessed data in the partition file. In other embodiment, the task manager 430 may wait until more data such as data 424a is appended to the partition file 422 so that there is enough data to create a processing task that meets the task size configuration 453. In still other embodiments, the task manager 430 may wait a predetermined amount of time and then create the processing task that only includes the remaining unprocessed data in the partition file.

Although not illustrated, sequential processing may also be performed on the partition file 425. Thus, the task manager 430 records in the configuration data store 450 that the partition file 425 is active as shown at 458 and also records the file size metadata 426c. A checkpoint record 459 is also recorded and updated as needed to track the processing of the partition file 425.

Figure 4C:
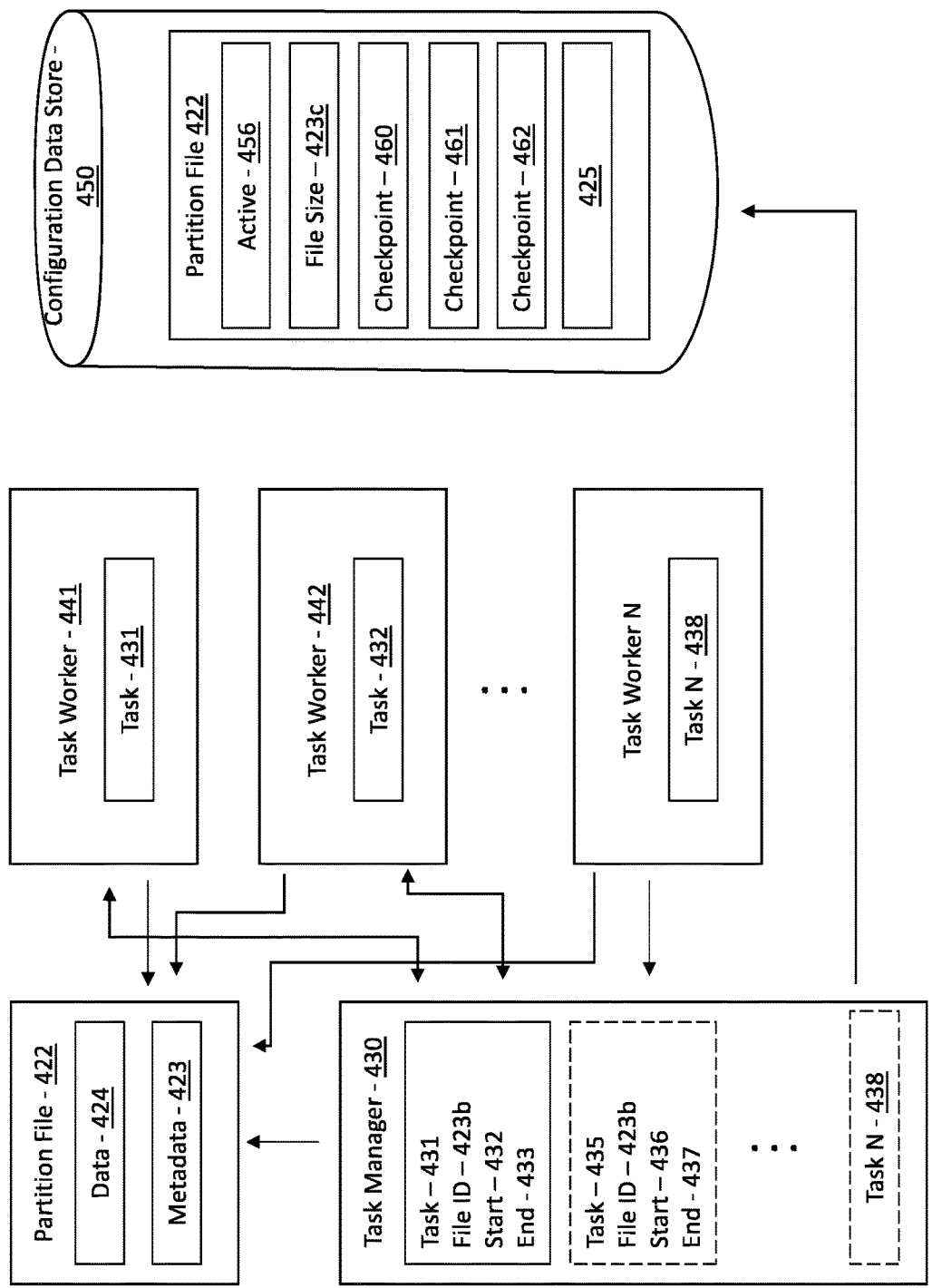
FIG. 4C illustrates an embodiment of parallel processing of a partition file.

FIG. 4C illustrates an embodiment of parallel processing of the partition file 422. As with the embodiment of FIG. 4B, the task manager 430 determines that the partition file is still active and then creates the processing tasks 431, 435, and up to processing task N 438 to include the file ID and the start and end positions as previously described in relation to FIG. 4B. The task manager 430 may select parallel processing based on the processing model configuration 454 or dynamically based on the processing load.

In parallel processing, the task manager 430 simultaneously creates the processing tasks 431, 435, and up to processing task N 438. Each of the processing tasks is assigned to multiple task worker instances. For example, the processing task 431 is assigned to the task worker instance 441, the processing task 435 is assigned to the task worker instance 442, and the processing task N 438 is assigned to the task worker instance N. In some embodiments, a threshold may set an upper limit to the number of parallel processing tasks that can be created at once so as to ensure efficient use of the processing resources of the near-real-time stream processing system 400. In addition, this helps ensure that checkpoint records per partition can be managed without causing performance issues in the configuration data store 450.

The task worker instances 441, 442, and N access the data in the partition file according to data range defined by their respective start and end positions and perform the appropriate processing on the data. The task worker instances 441, 442, and N report to the task manager 430 when they have completed their respective processing tasks.

The task manager 430 records the progress in the configuration data store 450. Since multiple task worker instances are reporting at different times, the task manager 430 may record more than one checkpoint in the configuration data store 450. For example, a checkpoint 460 and a checkpoint 461 may be recorded for the processing done for the processing tasks 431 and 435 respectively since it is possible that the data ranges of both of these processing tasks will not be continuous. The task manager 430 will check to see if an end position of one checkpoint is equal to the start position of another checkpoint. If this is found, then the task manager will merge the two checkpoints as shown at 462. In this way, it is possible to determine the overall processing progress of the partition file. Although not illustrated, parallel processing may also be performed on the partition file 425.

In some instances, a "hot" partition or data skew issue may occur when a much larger amount of data is placed in one partition file then is placed in the other partition files. In such instances, attempts to process the hot partition may slow the system down. Advantageously, parallel processing as described herein can provide at least a partial solution to this problem. Configuring parallel processing for the hot partition can quickly process the backlog in the hot partition without slowing the system down too much.

Figure 4D:
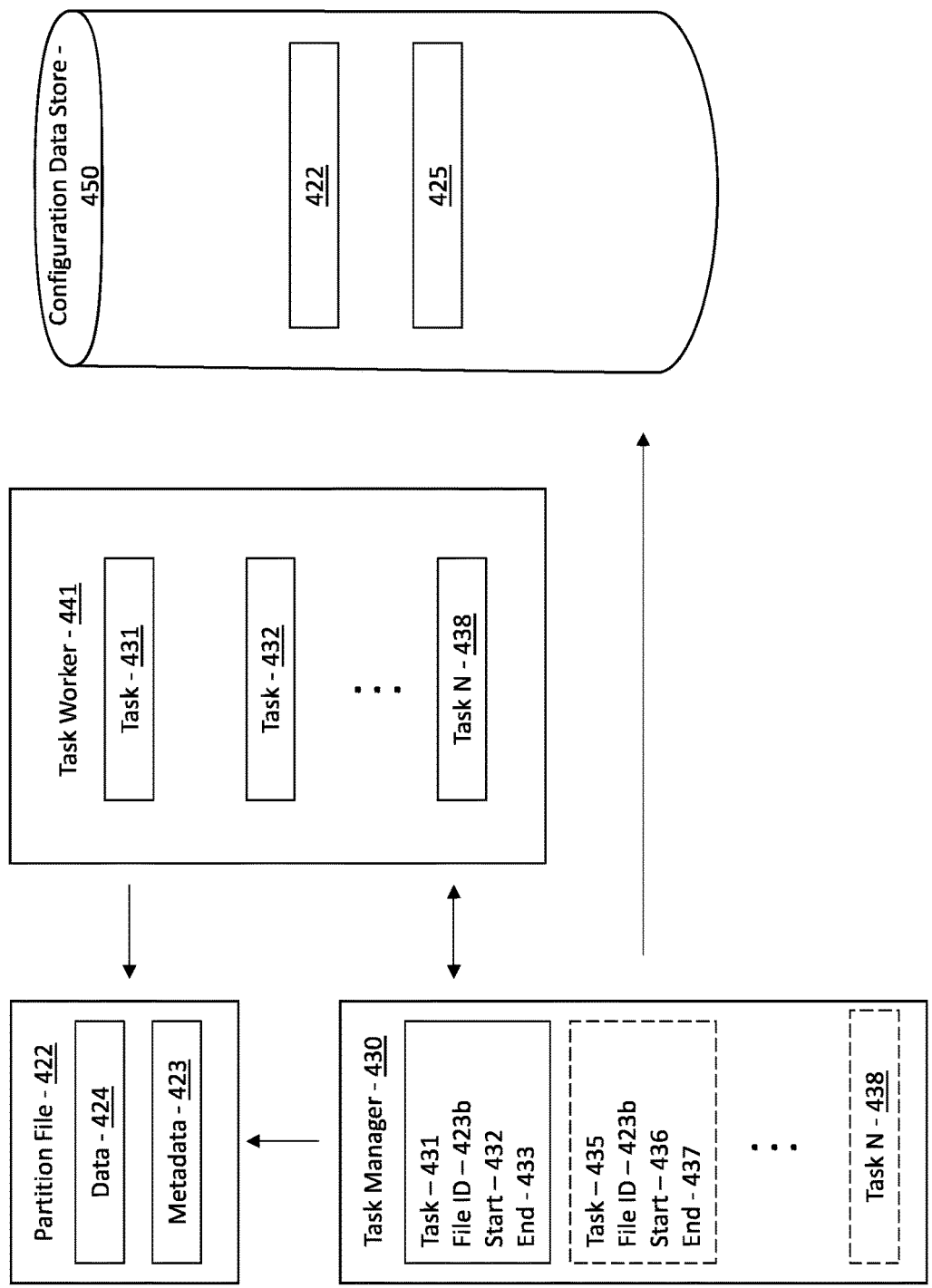
FIG. 4D illustrates an embodiment of parallel processing by the same working instance of the partition file.

FIG. 4D illustrates an embodiment of parallel processing by the same working instance of the partition file 422. As with the embodiment of FIG. 4B, the task manager 430 determines that the partition file is still active and then creates the processing tasks 431, 435, and up to processing task N 438 to include the file ID and the start and end positions as previously described in relation to FIG. 4B. The task manager 430 may select parallel processing by the same working instance based on the processing model configuration 454 or dynamically based on the processing load.

In parallel processing by the same working instance, the task manager 430 simultaneously creates the processing tasks 431, 435, and up to processing task N 438. Each of the processing tasks is assigned to the task worker instance 441. The task worker instance 441 then decides how to parallel process the processing tasks.

Once the processing tasks have been completed, the task worker instance 441 reports to the task manager 430. The task manager 430 then records the checkpoints in the configuration data store 450 as described in relation to FIG. 4C. Although not illustrated, parallel processing by the same working instance may also be performed on the partition file 425.

FIG. 4A further illustrates how the task manager 430 is able to dynamically at runtime discover new partition files. For example, suppose that partition files 422 and 425 are created by the partition file system 420 at the time that the data container 421 is created. The task manager 430 will scan the data container 421 and discover the partition files 422 and 425. The task manager 430 will then mark that these partition files are active in the configuration data store 450 as discussed previously since they are within the current partition lifetime window 452.

The task manager 430 will continue to periodically scan the data container 421. While scanning the data container 421 at a time subsequent to the time the data container is created, the task manager 430 may discover that the partition file 428 has been added to the data container 421. This is illustrated by the dashed lines around partition file 428. The task manager 430 will then mark that this partition file is active in the configuration data store 450 since it is within the current partition lifetime window 452. The task manager 430 will further read the metadata 428a of the partition file 428 to create and assign processing tasks for the data 425b of the partition file 428 and will record and update checkpoints for this partition file as previously discussed. The ellipses 429 illustrate that the task manager 430 may discover any number of additional partition files as they are created by the partition file system 420 during a given partition lifetime window. Accordingly, the embodiments disclosed herein do not require that the number of partitions be known ahead of runtime. Rather, the task manager 430 will discover any newly added partition files anytime it scans the data container 421 during the partition lifetime window 452.

In some embodiments, there may be a system failure or other processing delay that interrupts the near-real-time stream processing system 400. In such cases, when the task manager 430 is restarted, it loads all partitions that are marked as being active in the configuration data store 450. Since the last updated checkpoint will also be stored in the configuration data store 450, the task manager 430 will know where to pick up when assigning the processing tasks. This advantageously ensures that all data is process as needed. For example, suppose that there was an issue causing a processing delay for the partition file 422 and the current time stamp was for Jan. 15, 2020 at 07:00:00 when the processing delay occurred. The task manager can still discover the partition file 422 from the active record in the configuration data store 450 and will keep it active until all the data is properly processed even if the current time stamp is Jan. 18, 2020 at 04:00:00 when the task manager 430 is restarted.

Figure 4E:
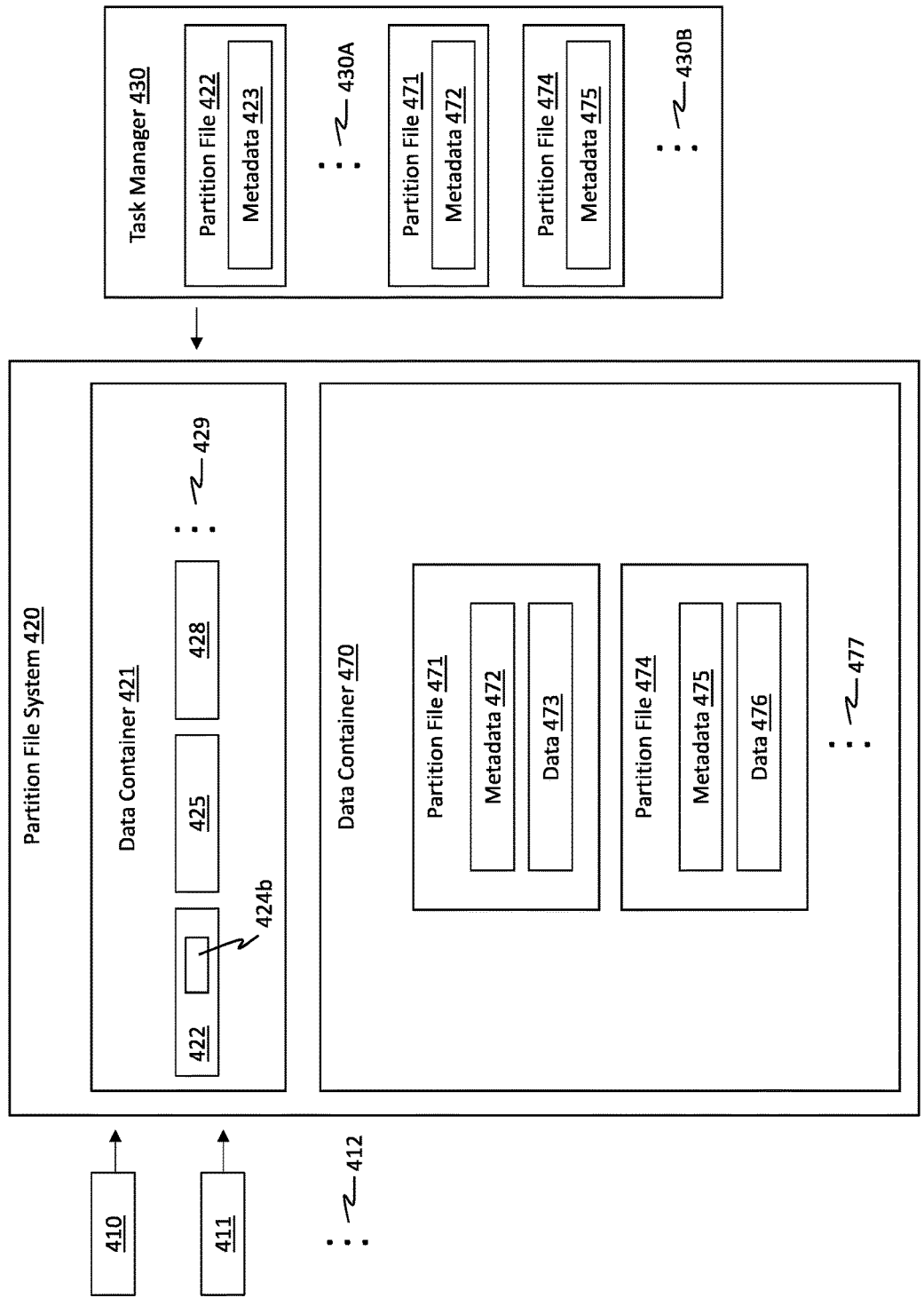
FIG. 4E illustrates a further embodiment of the near-real-time stream processing system of FIG. 4A.

FIG. 4E illustrates a further embodiment of the near-real-time stream processing system 400. As illustrated, the partition file system 420 has discovered the partition files 422, 425, 428, and potentially 429 during the partition window 451 for the data container 421. In the embodiment of FIG. 4E, however, the time has changed so that a new partition window 451 is now active. In other words, suppose the partition window 451 for the data container 421 and its partition files was Jan. 16, 2020 for 24 hours. Then the new partition window 451 would be Jan. 17, 2020 for 24 hours. Accordingly, at time 00:00:00 on Jan. 17, 2020 the partition file system 420 will create the data container 470 and also create a partition file 471, partition file 474, and potentially any number of additional partition files as illustrated by ellipses 477. Data received from the data producers 410-412 received after time 00:00:00 on Jan. 17, 2020 will be placed in the partition files 471, 474, and potentially 477. The partition file 471 will include metadata 472 and data 473. The partition file 474 will include metadata 475 and data 476. The metadata 472 and 475 may include the same types of metadata as discussed previously in relation to partition files 422 and 425.

The task manager 430 will begin to scan the data container 470 and will dynamically, at runtime (i.e., the task manger 430 does not know ahead of time the number of partition fields in the data container 470) discover the partition files 471, 474, and potentially the partition files 477. Suppose, however, that the partition lifetime window 477 for the data container 421 and its partition files was 30 hours, then this partition lifetime window would be active until 06:00:00 on Jan. 17, 2020. Accordingly, from 00:00:00 until 06:00:00 on Jan. 17, 2020 the task manager 430 will consider that the data container 421 and its partition files are still active and will continue to scan these partition files for any changes in the file size and last update metadata. Although data received after time 00:00:00 on Jan. 17, 2020 will be placed in the data container 470, there may be processing delays or the like that cause that some data that was received before the end of the 24-hour partition window of Jan. 16, 2020 to not be placed into one of the partition files of the data container 421 until after the end of that partition window or alternatively to not be processed before the end of the partition window. This is illustrated by data 424b that is appended to the partition file 422. Accordingly, having the partition lifetime window be larger than the partition window allows for the late arriving data to be processed with the Jan. 16, 2020 data and not the Jan. 17, 2020 data.

FIG. 4E shows that the task manager 430 periodically scans the partition file 422 and reads the metadata 423 since this partition file is still active. For ease of illustration, the ellipses 430A represent that the task manager 430 also periodically scans the partition file 425, 428, and potentially 429 and reads their respective metadata since these partition files are also considered active since the partition lifetime window 452 for the data container 421 and its partition files has not ended.

FIG. 4E also shows that the task manager 430 periodically scans the partition file 471 and reads the metadata 475 since this partition file is active since the partition window 451 for the data container 470 and its partition file is the current partition window. For ease of illustration, the ellipses 430B represent that the task manager 430 also periodically scans the partition file 474 and potentially 477 and reads their respective metadata since these partition files are included in the current partition window 451.

Figure 4F:
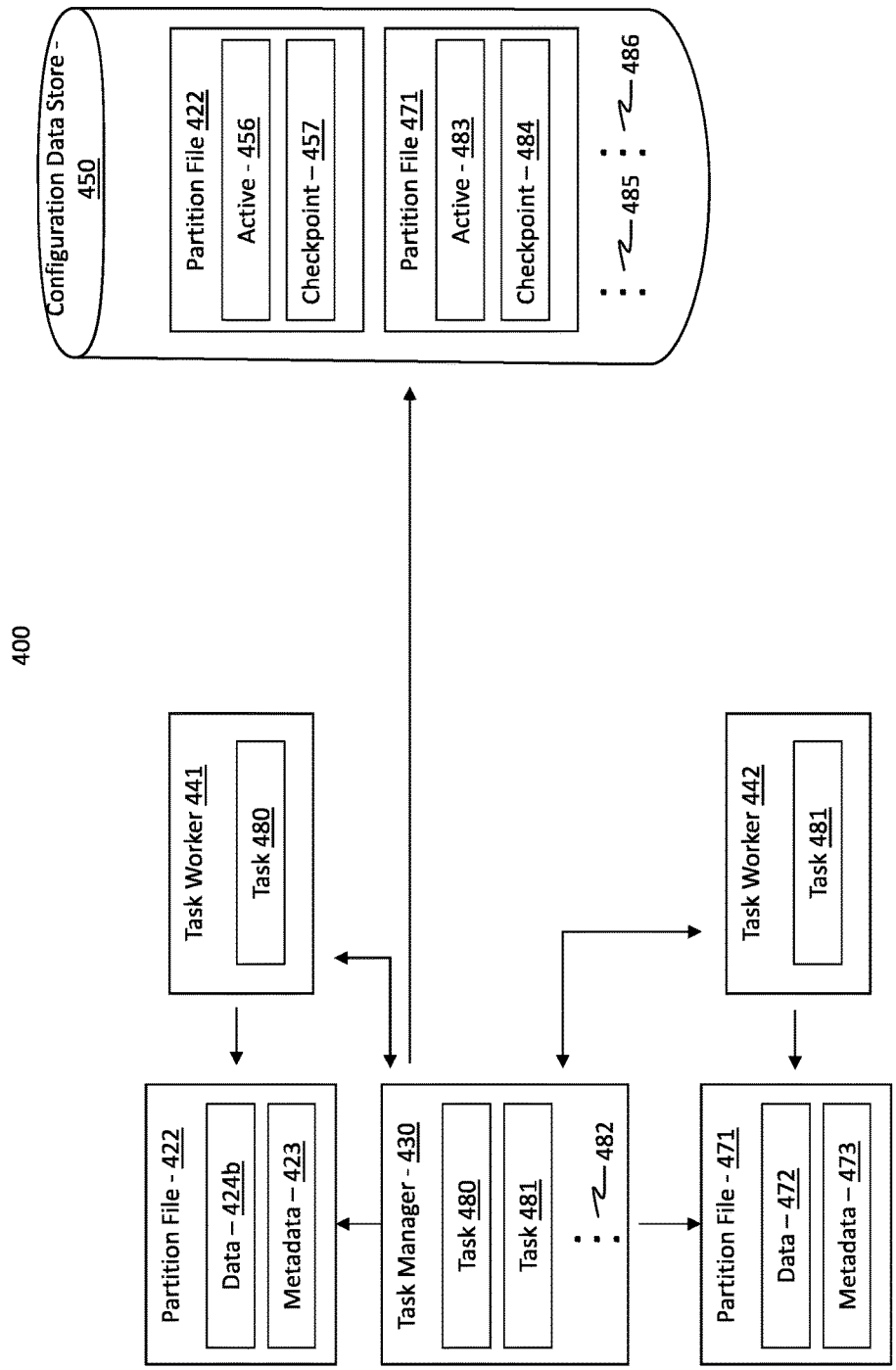
FIG. 4F illustrates sequential processing while a partition lifetime window for two data containers is active.

FIG. 4F illustrates sequential processing while the partition lifetime window 452 for the data container 421 and its partition files are still active. As shown in FIG. 4F, the task manager 430 creates a processing task 480 for the partition file 422 that includes an address range (not illustrated) that includes the data 424b. The task manager 430 may assign the processing task 480 to the task worker instance 441. The task worker instance 441 may then access the data 424b and perform the appropriate processing and report the progress back to the task manager 430 in the manner previously discussed. The task manager 430 may then record an updated checkpoint record 457 to reflect the processing of the data 424b. It will be noted that the configuration data store 450 will continue to show that the partition file 422 is active since the partition lifetime window 452 for the data container 421 and its partition files has not ended.

As shown in FIG. 4F, the task manager 430 also creates a processing task 481 for the partition file 471 that includes an address range (not illustrated) that includes a subset of the data 473 according to the task size configuration 453. The task manager 430 may assign the processing task 481 to the task worker instance 442. The task worker instance 442 may then access the data 473 included in the address range and perform the appropriate processing and report the progress back to the task manager 430 in the manner previously discussed. The task manager 430 may then record a checkpoint 484 to reflect the processing of the data 473. The task manager 430 will also record that the partition file 471 is active in the configuration data store 450 as denoted at 483. The ellipses 482 represent that the task manager 430 may create and assign any number of the additional processing tasks as needed for any of the other active partition files. The ellipses 485 and 486 are for ease of illustration and represent that the task manager 430 may record in the configuration data store 450 checkpoint information and active status information about any of the other active partition files of the data container 421 and data container 470, respectively.

Suppose that the timestamp shows that the time is 06:01:00 on Jan. 17, 2020. The task manager 430 determines that the partition lifetime window 452 for the data container 421 and its partition files has ended based on the time stamp. The task manager will scan the file size metadata 423c for the partition file 422, the file size metadata 426c for the partition file 425, and the file size metadata for the partition file 428 and any of the additional partition files 429. Using the file size metadata, the task manager determines if all of the data corresponding to the file size has been appropriately processed. If the data has been appropriately processed the data container 421 and its partition files will be closed.

Figure 4G:
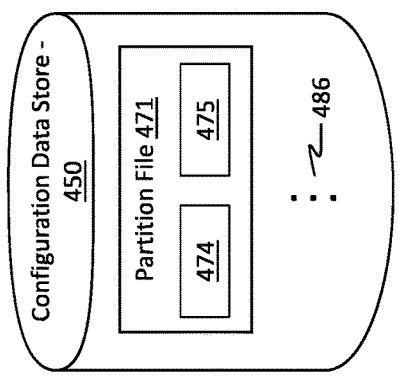
FIG. 4G illustrates a view of a configuration store after the partition lifetime window of FIG. 4F ends.

In addition, the information about the partition files of the data container 421 will be removed from the configuration data store 450. This is shown in the view of the configuration data store 450 shown in FIG. 4G where only information about the partition files of the data container 470 are shown as being recorded in the configuration data store 450. Thus, when a partition lifetime window ends, any record of the partition files associated with the partition lifetime window that indicate that the partition window is active are removed from the configuration store 450.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
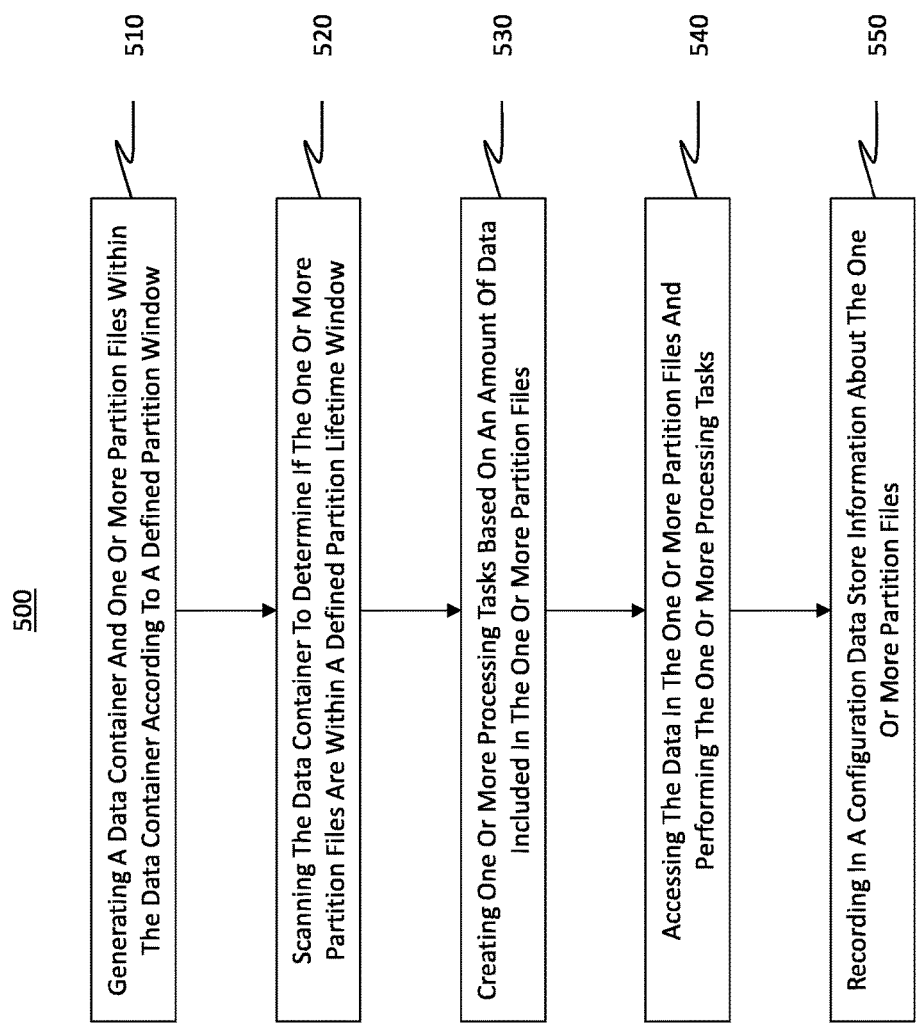
FIG. 5 illustrates an example method for implementing a near-real-time stream processing system using the same distributed file system as a batch processing system.

FIG. 5 illustrates a flow chart of an example method 500 for implementing a near-real-time stream processing system using the same distributed file system as a batch processing system. The method 500 will be described with respect to one or more of FIGS. 2-4E discussed previously.

The method 500 includes generating 510 a data container and one or more partition files within the data container according to a defined partition window. The defined partition window specifies a first time range that controls when data is to be included in the one or more partition files of the data container. For example, as previously discussed the partition file system 420 generates the data container 421 and the partition files 422, 425, 428, and potentially 429 and generates the data container 470 and the partition files 471, 474, and potentially 477. The partition files 422, 425, 428, and potentially 429 are generated during the partition window 451 for the data container 421 and its partition files. The partition files 471, 474, and potentially 477 are generated during the partition window 451 for the data container 470 and its partition files. The partition window 541 may be time range such as a day, an hour, or some other time period and data is appended to the partition files during this time range.

The method 500 includes scanning 520 the data container to determine if the one or more partition files are within a defined partition lifetime window. The defined partition lifetime window specifies a second time range that controls how long the one or more partition files are considered active such that processing is to be performed on the one or more partitions. For example, as previously discussed the task manager 430 scans the partition files 422, 425, 428, and potentially 429 and the partition files 471, 474, and potentially 477 to determine if the partition files are within the partition lifetime window 452. The partition files that are within the partition lifetime window 452 are considered active for processing. The partition lifetime window 452 is the time length of the partition window plus some additional amount of time.

The method 500 includes, for each partition file within the defined lifetime window, creating 530 one or more processing tasks based on an amount of data included in the one or more partition files. For example, as previously discussed the task manager 430 creates the processing tasks 431, 435, 480, and 481. The processing tasks may be based on the task size configuration 453.

The method 500 includes accessing 540 the data in the one or more partition files and performing the one or more processing tasks. For example, as previously discussed the task worker instances 440 directly access the data in the partition files and process the data according to the processing tasks.

The method 500 includes recording 550 in a configuration data store information about the one or more partition files. For example, as previously discussed the checkpoint records 457, 459, 460-462, and 484 may be stored in the configuration data store 450. In addition, other information such as the active status 456, 458, and 483 may also be recorded in the configuration data store 450.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for implementing a near-real-time stream processing system, the computing system comprising:
one or more processors; and
one or more computer readable hardware storage devices having computer executable instructions stored thereon that when executed by the one or more processors cause the computing system to:
generate a data container and one or more partition files within the data container according to a defined partition window, the defined partition window specifying a first time range that controls when data is to be included in the one or more partition files of the data container;
scan the data container to determine if the one or more partition files are within a defined partition lifetime window, the defined partition lifetime window specifying a second time range that controls how long the one or more partition files are considered active such that processing is to be performed on the one or more partitions;

for each partition file within the defined lifetime window, create one or more processing tasks based on an amount of data included in the one or more partition files;

access the data in the one or more partition files and perform the one or more processing tasks; and record in a configuration data store information about the one or more partition files.

2. The computing system of claim 1, wherein the one or more processing tasks comprise a sequential process where there is only one active processing task at any given time for a given partition file of the one or more partition files.

3. The computing system of claim 1, wherein the one or more processing tasks comprise a parallel process where two or more processing tasks are completed at substantially the same time by different processing instances for a given partition file of the one or more partition files.

4. The computing system of claim 1, wherein the one or more processing tasks comprise a parallel process within a same processing instance where two or more processing tasks are assigned to be performed by the same processing instance for a given partition file of the one or more partition files.

5. The computing system of claim 1, wherein while scanning the data container, the one or more partition files are discovered dynamically at runtime.

6. The computing system of claim 1, the computing system further caused to:

implement a batch processing system by:

accessing the data container and the one or more data partition files at an end of the first time range of the defined partition window;

generating one or more batches of the data included in the one or more partition files; and processing each of the one or more batches of data, such that the computing system is configured to implement both the near-real-time stream processing system and the batch processing system.

7. The computing system of claim 1, the computing system further caused to:

generate a second data container and one or more second partition files within the second data container according to a second defined partition window, the second defined partition window specifying a third time range that has a beginning after an ending of the first defined partition window but before an ending of the defined partition lifetime window;

prior to the ending of the defined partition lifetime window, scan the one or more partition files in the first data container and the one or more second partition files in the second data container, the one or more partition files and the one or more second partition files both being considered active during the defined partition lifetime window;

create one or more processing tasks for the one or more partition files and the one or more second partition files;

perform the processing tasks; and record in the configuration data store the information about the one or more partition files and information about the one or more second partition files.

8. The computing system of claim 7, the computing system further caused to:

close the one or more partition files when it is determined that the partition lifetime window has reached an end and it is determined that processing has been performed on all the data in the one or more partition files.

9. The computing system of claim 1, wherein the information about the one or more partition files recorded in the configuration data store comprises information about a progress of the one or more processing tasks.

10. The computing system of claim 1, wherein the data container and the one or more partition files are accessible by the near-real-time stream processing system and by a batch processing system at a same time or, alternatively, at a different time period.

11. A method for implementing a near-real-time stream processing system, the method comprising:

generating a data container and one or more partition files within the data container according to a defined partition window, the defined partition window specifying a first time range that controls when data is to be included in the one or more partition files of the data container;

scanning the data container to determine if the one or more partition files are within a defined partition lifetime window, the defined partition lifetime window specifying a second time range that controls how long the one or more partition files are considered active such that processing is to be performed on the one or more partitions;

for each partition file within the defined lifetime window, creating one or more processing tasks based on an amount of data included in the one or more partition files;

accessing the data in the one or more partition files and performing the one or more processing tasks; and recording in a configuration data store information about the one or more partition files.

12. The method of claim 11, wherein the one or more processing tasks comprise a sequential process where there is only one active processing task at any given time for a given partition file of the one or more partition files.

13. The method of claim 11, wherein the one or more processing tasks comprise a parallel process where two or more processing tasks are completed at substantially the same time by different processing instances for a given partition file of the one or more partition files.

14. The method of claim 11, wherein the one or more processing tasks comprise a parallel process within a same processing instance where two or more processing tasks are assigned to be performed by the same processing instance for a given partition file of the one or more partition files.

15. The method of claim 11, further comprising:

generating a second data container and one or more second partition files within the second data container according to a second defined partition window, the second defined partition window specifying a third time range that has a beginning after an ending of the first defined partition window but before an ending of the defined partition lifetime window;

prior to the ending of the defined partition lifetime window, scanning the one or more partition files in the first data container and the one or more second partition files in the second data container, the one or more partition files and the one or more second partition files both being considered active during the defined partition lifetime window;

creating one or more processing tasks for the one or more partition files and the one or more second partition files;

performing the processing tasks; and recording in the configuration data store the information about the one or more partition files and information about the one or more second partition files.

16. The method of claim 15, further comprising:
closing the one or more partition files when it is determined that the partition lifetime window has reached an end and it is determined that processing has been performed on all the data in the one or more partition files.

17. The method of claim 11, further comprising:
implementing a batch processing system, the batch processing system implemented by:
accessing the data container and the one or more data partition files at an end of the first time range of the defined partition window;
generating one or more batches of the data included in the one or more partition files; and
processing each of the one or more batches of data, such that the computing system is configured to implement both the near-real-time stream processing system and the batch processing system.

18. The method of claim 11, wherein the data container and the one or more partition files are accessible by the near-real-time stream processing system and by a batch processing system at a same time or, alternatively, at a different time period.

19. A computing system for implementing a stream processing system, the computing system comprising:
one or more processors; and
one or more computer readable hardware storage devices having computer executable instructions stored thereon that when executed by the one or more processors cause the computing system to instantiate the following:
a task manager component configured to scan a data container to discover if the data container includes one or more partition files and upon discovery, to determine if the one or more partition files are within a defined partition lifetime window, the partition lifetime specifying a time range that controls how long the one or more partition files are considered active such that processing can be performed on received data in the one or more partitions;
the task manager component further configured to create, for those partition files that are within the defined partition lifetime window, one or more processing tasks;
one or more task worker components configured to receive the one or more processing tasks from the task manager component and perform processing on the data in the one or more partition files according to the one or more processing tasks; and
the task manager component further configured store information in a configuration data store about the one or more partition files and about progress of the one or more processing tasks.

20. The computing system of claim 19, wherein the task manager component is further configured to:
to scan a second data container to discover if the second data container includes one or more second partition files;
prior to an ending of the defined partition lifetime window, scan the one or more partition files in the data container and the one or more second partition files in the second data container, the one or more partition files and the one or more second partition files both being considered active during the defined partition lifetime window;
create one or more processing tasks for the one or more partition files and the one or more second partition files to the task worker components; and
record in the configuration data store the information about the one or more partition files and information about the one or more second partition files after the one or more processing tasks have been performed by the task worker components.

* * * * *